(12) United States Patent
Hammer et al.

(10) Patent No.: US 8,268,129 B2
(45) Date of Patent: Sep. 18, 2012

(54) NONWOVEN HAVING IMPROVED WET FASTNESS AND ALKALI RESISTANCE AND CELLULOSE HYDRATE-BASED FOOD CASING FROM SAID NONWOVEN

(75) Inventors: Klaus-Dieter Hammer, Mainz (DE); Herbert Gord, Ingelheim (DE); Walter Lutz, Budenheim (DE)

(73) Assignee: Kalle GmbH, Wiesbaden (DE)

( * ) Notice: Subject to any disclaimer, the term of this patent is extended or adjusted under 35 U.S.C. 154(b) by 932 days.

(21) Appl. No.: 11/577,330

(22) PCT Filed: Oct. 15, 2005

(86) PCT No.: PCT/EP2005/011097
§ 371 (c)(1),
(2), (4) Date: Apr. 16, 2007

(87) PCT Pub. No.: WO2006/042713
PCT Pub. Date: Apr. 27, 2006

(65) Prior Publication Data
US 2009/0288791 A1 Nov. 26, 2009

(30) Foreign Application Priority Data
Oct. 20, 2004 (DE) .......................... 10 2004 051 298

(51) Int. Cl.
*D21H 13/02* (2006.01)
*D21H 13/08* (2006.01)

(52) U.S. Cl. .................... 162/146; 162/157.1; 162/157.7
(58) Field of Classification Search .................. 162/146, 162/157.1, 157.7
See application file for complete search history.

(56) References Cited

U.S. PATENT DOCUMENTS

| | | | | |
|---|---|---|---|---|
| 3,135,613 | A | 6/1964 | Underwood | 99/171 |
| 3,484,256 | A | 12/1969 | Chiu | 99/171 |
| 4,683,615 | A * | 8/1987 | Tomczak et al. | 452/24 |
| 5,928,737 | A * | 7/1999 | Hammer et al. | 428/34.8 |
| 6,033,698 | A * | 3/2000 | Hammer et al. | 426/105 |
| 6,048,917 | A * | 4/2000 | Hammer et al. | 524/36 |
| 2004/0096554 | A1 * | 5/2004 | Rose et al. | 426/135 |

FOREIGN PATENT DOCUMENTS

| | | |
|---|---|---|
| DE | 29 33 108 | 2/1981 |
| DE | 196 37 621 | 3/1998 |
| EP | 0460146 A1 | 7/1991 |
| EP | 0 733 306 A1 | 9/1996 |
| GB | 1 091 105 A | 11/1967 |
| GB | 2 324 615 A | 10/1998 |
| WO | WO 00/40092 A | 7/2000 |
| WO | WO 00/40092 A1 | 7/2000 |
| WO | WO 01/49914 A1 | 7/2001 |
| WO | WO 02/02871 A1 | 1/2002 |
| WO | WO 2005/110102 A1 | 11/2005 |

OTHER PUBLICATIONS

Karlsson editor, Papermaking Part 2:Drying, 2000, Fapet Oy, p. 110-111.*
Boedeker Plastics [downloaded online Boedeker Plastics], Polyethylene specifications, downloaded on:Aug. 12, 2010, whole document.*
Karlsson editor, Papermaking Part 2:Drying, 2000, Fapet Oy, p. 112-123.*
Chem 421: Introduction to Polymer Chemistry, downloaded online from http://chem.chem.rochester.edu/~chem421/cryst.htm, downloaded on Jul. 25, 2011.*
Glass Transition, downloaded online: http://www.lasalle.edu/academ/chem/ms/polymersRus/Resources/GlassTrans.htm, downloaded on Jul. 26, 2011.*
History and Physical Chemistry of HDPE, downloaded onlinehttp://www.plasticpipe.org/pdf/chapter 1_history_physical_chemistry_hdpe.pdf, downloaded on Jul. 26, 2011.*
Smook, Handbook for Pulp and Paper Technologists, 1992, Angus Wilde Publications, 2nd edition, chapter 17.*

* cited by examiner

*Primary Examiner* — Anthony Calandra
(74) *Attorney, Agent, or Firm* — ProPat, L.L.C.

(57) ABSTRACT

The invention relates to a wet-fast nonwoven, preferably a fiber paper, which comprises fibers from a cellulose-containing material and fibers from a thermoplastic material welded firmly together at their points of intersection. The fibers from the cellulose-containing material are preferably hemp fibers while the fibers from the thermoplastic material are preferably fibers from polypropylene, polyester or polyamide. The fibers are interlinked under the action of pressure and/or heat, especially using a pair of heated calender rolls. The nonwoven or the fiber paper is especially used to reinforce food casings based on regenerated cellulose, especially in artificial cellulose hydrate-based sausage skins.

23 Claims, No Drawings

NONWOVEN HAVING IMPROVED WET FASTNESS AND ALKALI RESISTANCE AND CELLULOSE HYDRATE-BASED FOOD CASING FROM SAID NONWOVEN

CROSS-REFERENCE TO RELATED APPLICATIONS

This application is being filed under Rule 1.371 as a National Stage Application of pending International Application No. PCT/EP2005/011097 filed Oct. 15, 2005, which claims priority to the following parent application: German Patent Application No. 10 2004 051 298.1, filed Oct. 20, 2004. Both International Application No. PCT/EP2005/011097 and German Patent Application No. 10 2004 051 298.1 are hereby incorporated by reference herein in their entirety.

FIELD OF THE INVENTION

The invention relates to a wetfast nonwoven having fibers of cellulosic material and fibers of a thermoplastic, a process for production thereof and cellulose hydrate-based food casings produced therewith.

BACKGROUND OF THE INVENTION

Fibrous papers for special applications, such as tea bag paper or fibrous paper for reinforcing food casings based on regenerated cellulose must first be made wetfast. This is achieved, for example by treatment with dilute viscose solution, as disclosed in U.S. Pat. No. 3,135,613. Food casings, in particular sausage casings, based on regenerated cellulose having a fibrous paper insert (generally termed cellulose fiber skins) are generally produced by coating with viscose. Viscose, however, is strongly alkaline and to a considerable extent redissolves the cellulose hydrate which originates from the dilute viscose solution and bonds the fibers to one another. The strength of the fibrous paper therefore decreases on coating with viscose by up to 50% or even more.

This disadvantage may be avoided according to GB 1 091 105 if, as early as during papermaking, a synthetic resin is mixed with the fibers. Synthetic resins which are preferably used are polyethyleneimines and polyamine-polyamide-epichlorohydrin resins.

A still more effective bonding of the fibrous paper may be achieved if, as binder, use is made of a mixture of polyamine-polyamide-epichlorohydrin resin and polyacrylamide (U.S. Pat. No. 3,484,256). However, fibrous papers bonded with polyamine-polyamide-epichlorohydrin resins are not thermostable. If they have been heated too greatly, which can easily occur, in particular on drying, the resin binding becomes brittle and breaks.

Compared with a fibrous paper bonded with dilute viscose, a fibrous paper which is more stable on exposure to strongly alkaline coating viscose is that which is bonded with NMMO-cellulose (DE 196 37 621). For bonding the fibers, in this case, use is made of cellulose dissolved in aqueous N-methylmorpholine-N-oxide (NMMO). The bonding is still greater if during production of the fibrous paper a polyamine-polyamide-epichlorohydrin resin is added.

Finally, a fibrous paper is also known which, in addition to cellulosic fibers such as hemp fibers, also contains synthetic fibers, in particular those made of polyamide, polyester or polyolefin (WO 00/40092). The fibers in this paper are bonded with regenerated cellulose and/or synthetic resin.

A two-layer nonwoven material is further known having a first nonwoven layer of thermoplastic polymer fibers or filaments and a second nonwoven layer of cellulose fibers or a mixture of cellulose fibers and synthetic fibers (WO 01/49914). The polymer fibers or filaments of the first layer are bonded to one another by calendering at a temperature below their softening temperature. The fibers or filaments of the two layers are bonded to one another in particular by what is termed hydroentanglement. The two nonwoven layers each have a weight of about 5 to 100 $g/m^2$. The two-layer nonwoven material is used, for example for molded parts in automobile construction or as a wiping cloth.

WO 02/02871 relates to a nonwoven having a weight of about 10 to 50 $g/m^2$, from which, in particular, tea bags may be produced. It contains fibers of cellulose and polylactic acid. The polylactic acid fibers are thermoplastic and heat sealable so that two layers of the nonwoven may be bonded to one another by a sealed seam under the action of pressure and heat. The production of tea bags is arranged particularly simply by this means.

The fibrous paper according to GB-A 2 324 615 contains cellulose fibers, principally hemp fibers, and if appropriate fibers made of synthetic polymers. The fibers are bonded therein using a mixture of various resins. The paper is processed in particular to give heat sensitive stencil paper.

For food casings, in particular sausage casings, customarily use is made of fibrous papers having a weight of 15 $g/m^2$, 17 $g/m^2$, 19 $g/m^2$, 21 $g/m^2$, 23.7 $g/m^2$ or 25.4 $g/m^2$, according to the caliber of the casing.

The previously produced cellulose fiber skins generally contain 33 to 55 $g/m^2$ of cellulose hydrate and in addition customarily about 15 to 30 $g/m^2$ of glycerol which serves as a secondary plasticizer. The water content of the casings is generally about 8 to 10% by weight. Its total weight is generally, according to caliber, about 75 to 115 $g/m^2$. They are thus relatively heavy and stiff and can only be handled with difficulty, which is disadvantageous, in particular in final processing (especially on shirring the fiber skins to form shirred sticks).

There have already been attempts in many ways to achieve lighter fiber skins. For this use was made of a particularly light fibrous paper having a weight of less than 15 $g/m^2$ which was then coated with the customary amount of viscose (EP-A-0 460 146). However, this measure led to products having impaired mechanical properties. As an alternative, fiber skins were produced using standard fibrous paper and a reduced amount of viscose with simultaneously increased spinning rate (EP-A-0 733 306). It was found in this case that the strength of these fiber skins increased relatively, but they have not to date been able to establish themselves on the market.

Despite all the efforts, there is to date no fibrous paper available which is suitable for producing cellulose fiber skins, being stable to hydrolytic attack of the coating viscose and simultaneously insensitive to thermal stress. The coating viscose must in addition be able to penetrate well any newly produced fibrous paper. The fibrous paper must finally bond firmly to the regenerated cellulose.

SUMMARY OF ADVANTAGEOUS EMBODIMENTS OF THE INVENTION

Surprisingly it has been found that a fibrous paper or nonwoven which is virtually insensitive to alkaline hydrolysis and the action of heat can be obtained if, in its production, thermoplastic fibers are admixed which, under the action of heat and/or pressure, melt at least in part and, after cooling, cause firm bonding of the fibers to one another at the intersection points. Therefore, at the intersection points the plastic fibers bond to the other fibers, that is in particular the hemp fibers. It has the further advantage that on further processing of the viscose or NMMO-cellulose solution used for coating it is readily penetrated and bonds firmly to the regenerated or precipitated cellulose.

DETAILED DESCRIPTION OF ADVANTAGEOUS EMBODIMENTS OF THE INVENTION

The present invention therefore relates to a wetfast nonwoven or fibrous paper having fibers made of cellulosic material and fibers made of thermoplastic, characterized in that after at least partial melting of the thermoplastic the fibers are firmly bonded to one another at the intersection points.

The fraction of fibers made of thermoplastic is generally 2 to 20% by weight, preferably 5 to 15% by weight, particularly preferably 7.5 to 12% by weight, in each case based on the weight of the fibers made of cellulosic material. A fraction of fibers made of thermoplastic above said upper limit would impair the adhesion of the regenerated or precipitated cellulose to the fiber reinforcement. The fibers made of the thermoplastic are present in the nonwoven or in the fibrous paper virtually homogeneously mixed with the other fibers.

The fibers made of cellulosic material are preferably hemp fibers. Instead of, or additionally to, the hemp fibers, other plant cellulosic fibers or those derived therefrom, in particular chemically modified plant fibers, can also be present.

The fibers made of thermoplastic are preferably those made of polyolefin (in particular polypropylene) or block copolymers having polyolefin blocks, polyesters (in particular polyethylene terephthalate, polybutylene terephthalate or a PET copolymer) or polyamide (in particular aliphatic or partially aromatic polyamide, such as nylon 6, nylon 4.6, nylon 6.6, nylon 6.10, nylon 6.12 or nylon 6.66. Preference is given to non-drawn or low-draw ratio fibers which have an amorphous structure or a partially crystalline structure having a low degree of crystallinity and correspondingly a relatively low softening temperature.

The fibers made of thermoplastic generally have a thickness of about 0.5 to 8 denier (den), preferably about 1 to 5 den. Their length is generally about 0.3 to 15 mm, preferably about 4 to 8 mm.

The fibers can also comprise a plurality of components as is the case, for example, with bicomponent or multicomponent fibers. Those which may be mentioned here are fibers having a skin-core structure (S/C) or a side by side structure (S/S). At least one of the components, in the case of S/C types at least the outside component, should then have a sufficiently low softening temperature in order to permit welding of the fibers.

In a particular embodiment, the fibers are additionally bonded by a synthetic resin, in particular a polyamine-polyamide-epichlorohydrin resin. The fraction of the synthetic resin is expediently 0.5 to 3.0% by weight, preferably 1.0 to 2.5% by weight, in each case based on the dry weight of the nonwoven or fibrous paper.

Generally the nonwoven or fibrous paper is additionally bonded by regenerated cellulose. This may be achieved, for example by treatment with a dilute viscose which expediently contains about 1 to 2% by weight of cellulose xanthogenate.

The nonwoven or fibrous paper of the invention is generally one-layer. In the dry state it has a weight of about 13 to 28 g/m$^2$. It exhibits a surprising strength which on exposure to aqueous alkali decreases very much less than with the known viscose-bonded or viscose/resin-bonded fibrous papers as shown in the tables hereinafter.

Therefore, use may be made of a fibrous paper having a lower weight per unit area than hitherto without the product produced therewith showing a loss in strength. Also the binding of the fibrous paper which hitherto was a very critical process step is significantly simpler in the case of the fibrous paper of the invention and no longer needs exact control.

The fibrous paper or nonwoven of the invention is produced by processes which are in principle familiar to those skilled in the art active in fibrous paper manufacture. It comprises, in particular, the following steps:
- providing an aqueous pulp which comprises fibers made of cellulosic material and fibers made of or comprising thermoplastic polymers;
- if appropriate mixing the fiber pulp with water-soluble binders, preferably with cationic polyamine-polyamide-epichlorohydrin resins;
- laying the fibers on a screen for formation of a fibrous paper;
- drying the fibrous paper;
- at least partial melting of the thermoplastic fibers and as a result bonding these fibers to the fibers made of cellulosic material which can proceed, for example, by calendering with heated calender rollers, under the action of microwaves and/or infrared radiation, and
- treating the dry fibrous paper with dilute viscose, regeneration of the viscose to give cellulose hydrate (generally using an acidic precipitation bath) and renewed drying.

The pulp contains relatively few fibers, preferably no more than 0.5% by weight, particularly preferably about 0.10 to 0.25% by weight. The fibers are then deposited from the fiber pulp preferably on an inclined screen to give a coarsely structured fibrous paper. The fibrous paper is dried particularly expediently on heated rollers having a large diameter (about 1 to 2 m in diameter). The temperature required to melt the thermoplastic fibers depends on the type of the fibers. Typically, the calender rolls have a temperature in the range from about 100 to 140° C. The treatment with dilute viscose for producing the viscose bonding preferably proceeds after calendering; if it takes place before this it is partially destroyed again. The fraction of the regenerated cellulose obtained from the dilute viscose is expediently 1.0 to 3.0% by weight, based on the total weight of the (dry) nonwoven. The viscose bonding has the effect that the nonwoven can be penetrated better by the coating viscose used in production of cellulose fiber skins. The cellulose hydrate from the coating viscose then adheres in addition significantly better.

The nonwoven according to the invention can be used as tea bag paper. However, it is particularly suitable as reinforcement in food casings based on cellulose hydrate. The present invention therefore also relates to a food casing based on regenerated or precipitated cellulose which comprises a reinforcement made of the nonwoven or fibrous paper according to the invention.

Using the fibrous paper described which is bonded in a manner which is thermostable and stable to hydrolysis, cellulose fiber skins having completely new properties become accessible. For instance, the amount of viscose which is applied to the fibrous paper shaped to form the tube can be reduced by about 20 to 50% by weight. The weight fraction of the nonwoven or fibrous paper is accordingly, in the preferred embodiment, about 25 to 40%, preferably about 28 to 35%, of the total weight of the casing in the dry state. The strength of the cellulose fiber skin is then surprisingly just as high as that of a fiber skin which was produced using conventional fibrous paper and the full amount of viscose. At the same strength, the food casing according to the invention is, in addition, more supple and more transparent. Since it is relatively thin, more meters thereof can be compacted to form a shirred stick of a predetermined length (for example, from 50 meters of a casing according to the invention of caliber 58, a 42 cm long shirred stick can be produced). Furthermore, the spinning speed can be increased by 60 to 180%, which further rationalizes production. The food casings of the invention are therefore accompanied by considerable material and energy cost savings, which also decreases environmental pollution.

The tubular food casings of the invention can be additionally coated or impregnated on the inside and/or outside. Suitable coatings or impregnations are generally known to those skilled in the art. Those which may be mentioned are, in particular, PVDC inner coatings which greatly reduce the permeability of the casing to water vapor and atmospheric oxygen. For the PVDC inner coating, use is made in particular of vinylidene chloride copolymers which have about 60 to 85% by weight of VDC units. In addition, impregnations may be mentioned with which the adhesion of the casing to the food situated therein may be set. Reference is made particularly to what are termed easy peel impregnations which make the casing easy to peel off. Finally, the food casing of the invention can also be impregnated with liquid smoke or other aroma substances, flavor substances and/or dyes.

The food casing of the invention is produced by processes which are known in principle to those skilled in the art. In these processes the fibrous paper which is bonded in a manner which is thermostable and stable to hydrolysis is generally cut into webs of appropriate width which are shaped to form tubes having overlapping longitudinal edges. The tubes are then charged from the outside, from the inside or from both sides with viscose (outer viscosing, inner viscosing or double viscosing). In precipitation and wash baths, the cellulose is regenerated from the viscose. Alternatively, the tubes made of the fibrous paper of the invention can also be coated with NMMO-cellulose solutions from the outside, from the inside or from both sides. This procedure has the advantage that no acidic precipitation baths are required. In order to modify the properties of the food casings in accordance with the requirements of users, it is possible to add to the viscose or the NMMO-cellulose solution polymeric additives such as alginic acid or alginates or polyvinylpyrrolidone. Preference is given to additives which permanently plasticize the food casing, that is act as primary plasticizers.

The cellulose fiber skins of the invention can be finally processed in a generally known manner, in particular they can be compacted in sections to form shirred sticks.

The examples hereinafter serve to illustrate the invention. Percentages are percentages by weight unless stated otherwise or immediately clear from the context.

Example 1

An aqueous paper fiber pulp having 0.1 to 0.2% fiber fraction was produced which contained hemp fibers having a mean length of 2 mm and 5%, based on the weight of the hemp fibers, amorphous polypropylene fibers having a mean length of 5 mm. To the fiber pulp was added a water-soluble polyamine-polyamide-epichlorohydrin resin in an amount which gives a fraction of 2% in the dry fibrous paper. The fibers from the fiber pulp were deposited on an inclined screen to give a fibrous paper. The wet paper was then passed over a heated roller and dried. Before reeling, the fibrous paper was passed through a calender roller pair heated to 120° C. to melt the propylene fibers and to bond them with one another at the intersection points. The dried paper was passed through a bath containing a 1% strength viscose and subsequently through an acidic precipitation bath and also a plurality of wash baths in which the viscose was regenerated to cellulose. Thereafter it was dried again. The fibrous paper thus produced had a weight of 17 $g/m^2$. It contained 1.5% of regenerated cellulose. Its tearing strength was 5.7 N in the longitudinal direction and 7.1 N in the transverse direction. The elongation at break was 8.9% in the longitudinal direction and 4.9% in the transverse direction.

After 10 min of treatment with 6% NaOH, the paper had lost only 15% of wet strength, whereas a conventional paper (without addition of thermoplastic fibers) loses about 24 to 26%.

The paper was cut in the generally known manner to an appropriate width, shaped to form a tube with caliber 60 having overlapping longitudinal seams and coated from the outside with viscose. The viscose was able to penetrate the fibrous paper faultlessly. The regenerated cellulose exhibited a good adhesion to the fibrous paper and could no longer be separated from the fibrous paper even with mechanical stress, without complete destruction. The complete fiber skin had a weight of 84 $g/m^2$ and exhibited a bursting pressure (wet) of 79 kPa, that is a value higher by 13% than that customary for a 17 $g/m^2$ paper. The static extension at 21 kPa internal pressure remained unchanged at 64.8 mm (specification: 63.3 to 66.3 mm).

Example 2

Example 1 was repeated with the difference that the wetfast 17 $g/m^2$ paper was shaped to form a tube of caliber 58 with overlapping edges. The tube was then coated from the outside with an amount of viscose decreased by 30% compared with example 1. The spinning speed was twice as high as in example 1. Despite the increase in spinning speed by 100%, the composition of the spinning bath could remain unchanged. The viscose penetrated the fibrous paper faultlessly. The regenerated cellulose showed a good adhesion to the fibrous paper and could no longer be separated from the fibrous paper, even with mechanical stress, without complete destruction. The finished fiber skin had a weight of 65 $g/m^2$ at a water content of 10%. The bursting pressure (wet) was 81 kPa. The bursting pressure was thus exactly the same as with a fiber skin of caliber 58 which was produced using conventional 21 $g/m^2$ paper and the complete amount of coating viscose. The static extension at 21 kPa internal pressure remained unchanged at 64.8 mm (specification: 63.3 to 66.3 mm).

Example 3

As described in example 1, an aqueous pulp containing 0.2% fibers was formed which contained 15%, based on the weight of the hemp fibers, of polypropylene fibers having a mean length of 3 mm. As described, a coarsely structured fibrous paper was produced from the fiber pulp. The dried paper was treated in the same manner with a 1% strength viscose and the viscose was regenerated to cellulose. Subsequently drying was performed again. The dry fibrous paper had a weight of 19 $g/m^2$. It had a tear strength (wet) of 7.6 N in the longitudinal direction and 9.6 N in the transverse direction. The elongation at break was 9.1% in the longitudinal direction and 5.2% in the transverse direction and thus corresponded approximately to that of a conventional paper without addition of plastic fibers. The fraction of regenerated cellulose in the paper was about 1.8%. After 10 min of treatment with 6% strength NaOH, the paper had lost only about 8% of its wet strength.

The paper was shaped to form a tube of caliber 75 which was coated from the outside with viscose, the amount of viscose applied per unit area being decreased by 40% compared with example 1 and the spinning speed being increased by 120%. The viscose was able to penetrate the paper faultlessly, just as well as with a conventional paper. The regenerated cellulose showed good adhesion to the fibrous paper. The completed fiber skin had a weight of 50 g/m² and exhibited a bursting pressure (wet) of 76 kPa. It was thus 22% above the bursting pressure which is customary for a fiber skin having 19 g/m² fibrous paper. The static extension at 21 kPa internal pressure was 81.6 mm and thus within the required range (specification: 80.3 to 83.3 mm).

Example 4

Example 3 was repeated with the difference that the 19 g/m² fibrous paper shaped to form a tube of caliber 75 was coated from the outside with an amount of viscose reduced by 45% compared with example 3. The spinning speed was increased by 120% compared with example 3. The viscose was able to penetrate the fibrous paper without problems and the regenerated cellulose exhibited good adhesion to the fibrous paper. The finished fiber skin had a weight of 47 g/m² at a water content of 10%. It exhibited a bursting pressure (wet) of 76 kPa. It was thus 22% above the bursting pressure which is measured for a fiber skin produced with 19 g/m² fibrous paper and the full amount of viscose. The static extension at 21 kPa inner pressure was 81.6 mm and thus within the required range (specification: 80.3 to 83.3 mm).

Example 5

A food casing was produced in accordance with example 4, the fibrous paper of which after the described treatment with alkali achieved the strength of a 23 g/m² paper. This paper was shaped to form a tube of caliber 58 and then coated from the outside with an amount of viscose reduced compared with example 1 by 30% per unit area. The spinning speed could be increased by 100% with unchanged composition of the spinning bath.

The fiber skin thus produced exhibited a bursting pressure of 90 kPa. This was virtually identical to a fiber skin having a conventional 19 g/m² of paper which had been produced with the full amount of viscose. As a result of the smaller wall thickness of the fiber skin of the invention, a shirred stick of customary length of 420 mm comprised 40 m of the casing instead of 33 m as with conventional casing.

The fiber skin was able to be stuffed with salami emulsion and clipped without loss. The course of ripening was conventional.

Example 6

A food casing according to example 2 was produced with the difference that, from the fibrous paper, a tube of caliber 90 having overlapping edges was formed. The tube was charged from the outside with an amount of viscose reduced by 25%, as a result of which the spinning speed could be increased by 80%, without the composition of the spinning bath needing to be changed.

The completed fiber skin had a weight of 63 g/m², at a water content of 10%. The bursting pressure (wet) was 52 kPa which corresponded to that of a fiber skin which had been produced with a conventional 19 g/m² paper and the full (100%) amount of viscose.

50 m of the casing of the invention were able to be compacted to form a shirred stick having a customary length of 42 cm, whereas this was only 33 m in the case of a conventional casing.

The casing was able to be stuffed and sealed by clipping just as well as a conventional casing. The ripening process after stuffing with long-life sausage emulsion was normal.

Example 7

Here, use was made of a 15 g/m² hemp fibrous paper which contained 10% welded polypropylene fibers, based on the weight of the hemp fibers. The strength of this paper corresponded after treatment with alkali to that of a conventional 19 g/m² paper. The paper having the polypropylene fibers was shaped to form a tube of caliber 40 having overlapping edges and the resultant tube was charged from the outside with viscose, the spinning speed having been increased by 50%, without changing the composition of the spinning bath. The amount of viscose applied per unit area was decreased by 25% compared with example 1. After passing through the conventional spinning and wash baths and the dryer, the cellulose fiber skin had a weight of 60 g/m². The bursting pressure (wet) of the casing was 106 kPa. This value thus corresponds virtually exactly to that of a cellulose fiber skin using a conventional 17 g/m² paper.

The shirred sticks having a standard length of 42 cm comprised 40 m of this casing.

The casing was able to be stuffed with long-life sausage emulsion without problems and without losses due to bursting. The ripening behavior was assessed as "customary".

Example 8

Comparative Example

A hemp fiber paper having a weight of 17 g/m² which did not contain plastic fibers was shaped to form a tube of caliber 58 having overlapping longitudinal edges. The tube was then coated from the outside with viscose using a ring die. After passing through the various spinning and wash baths, a conventional cellulose fiber skin having a weight of 84 g/m² was obtained therefrom, at a water content of 10%. The bursting pressure (wet) of the fiber skin was 80 kPa.

The 17 g/m² fibrous paper used for this fiber skin had the strength values listed in table 1 hereinafter.

TABLE 1

| Fibrous paper | | without plastic fibers (comparison) | | | with 15% polypropylene fibers Strength after alkali | | |
|---|---|---|---|---|---|---|---|
| | | | Strength after alkali | | | | |
| Paper weight [g/m²] | Direction | wet [N] | treatment [N] | loss [%] | wet [N] | treatment [N] | loss [%] |
| 15 | longitudinal | 4.2 | 3.2 | 24 | 5.0 | 4.25 | 15 |
| | transverse | 5.2 | 4.0 | 23 | 6.2 | 5.2 | 16 |
| 17 | longitudinal | 4.8 | 3.6 | 24 | 5.7 | 4.8 | 16 |
| | transverse | 5.9 | 4.6 | 21 | 7.1 | 6.0 | 15 |
| 19 | longitudinal | 5.4 | 4.3 | 21 | 6.5 | 5.6 | 14 |
| | transverse | 7.1 | 5.6 | 20 | 8.5 | 7.4 | 16 |
| 21 | longitudinal | 6.6 | 5.2 | 21 | 7.9 | 6.7 | 15 |
| | transverse | 7.6 | 6.0 | 21 | 9.1 | 7.9 | 16 |

TABLE 1-continued

|  |  | without plastic fibers (comparison) | | | with 15% polypropylene fibers Strength after alkali treatment | | |
|---|---|---|---|---|---|---|---|
| | | Strength after alkali treatment | | | | | |
| Fibrous paper | | | | | | | |
| Paper weight [g/m²] | Direction | wet [N] | treatment [N] | loss [%] | wet [N] | ment [N] | loss [%] |
| 23 | longitudinal | 7.2 | 5.5 | 23 | 8.6 | 7.4 | 17 |
| | transverse | 8.8 | 7.1 | 19 | 10.6 | 9.0 | 15 |
| 25 | longitudinal | 8.5 | 7.0 | 17 | 10.2 | 8.8 | 14 |
| | transverse | 10.4 | 8.7 | 16 | 10.4 | 9.0 | 13 |

TABLE 2

|  |  | with 10% polypropylene fibers (comparison) | | | with 15% polypropylene fibers Strength after alkali treatment | | |
|---|---|---|---|---|---|---|---|
| | | Strength after alkali treatment | | | | | |
| Fibrous paper | | | | | | | |
| Paper weight [g/m²] | Direction | wet [N] | treatment [N] | loss [%] | wet [N] | ment [N] | loss [%] |
| 15 | longitudinal | 4.2 | 4.1 | 12 | 5.9 | 5.35 | 9.0 |
| | transverse | 5.8 | 5.0 | 13 | 8.7 | 8.0 | 8.0 |
| 17 | longitudinal | 6.2 | 5.5 | 11.3 | 6.7 | 6.2 | 7.5 |
| | transverse | 7.7 | 6.8 | 11.7 | 8.3 | 7.6 | 8.5 |
| 19 | longitudinal | 7.0 | 6.2 | 11.4 | 7.6 | 7.0 | 8.0 |
| | transverse | 9.2 | 8.1 | 12 | 9.6 | 8.8 | 9.5 |
| 21 | longitudinal | 8.6 | 7.6 | 11.4 | 7.3 | 6.7 | 8.0 |
| | transverse | 9.9 | 8.7 | 12.2 | 8.4 | 7.6 | 9.0 |
| 23 | longitudinal | 9.35 | 8.2 | 12.3 | 7.7 | 7.1 | 8.0 |
| | transverse | 11.4 | 10.0 | 12.3 | 9.9 | 9.1 | 8.0 |
| 25 | longitudinal | 11.0 | 8.7 | 11.8 | 9.8 | 9.2 | 6.0 |
| | transverse | 13.5 | 11.9 | 11.9 | 12.2 | 11.3 | 7.0 |

TABLE 3

| | Examples | | | | | | | |
|---|---|---|---|---|---|---|---|---|
| | 1 | 2 | 3 | 4 | 5 | 6 | 7 | 8* |
| Paper weight | 17 g/m² | 17 g/m² | 19 g/m² | 19 g/m² | 17 g/m² | 17 g/m² | 15 g/m² | 17 g/m² |
| PP fibers | 5% | 5% | 15% | 15% | 5% | 15% | 10% | 0 |
| Caliber | 60 | 58 | 75 | 75 | 58 | 90 | 40 | 58 |
| Coated | 84 g/m² | 65 g/m² | 50 g/m² | 47 g/m² | 65 g/m² | 70 g/m² | 76 g/m² | 84 g/m² |
| Viscose | Conventional | −30% | −40% | −30% | −30% | −25% | −20% | Conventional |
| Spinning speed | Conventional | +100% | +120% | +120% | +100% | +80% | +50% | Conventional |
| Bursting pressure (wet) | 79 kPa | 81 kPa | 76 kPa | 76 kPa | 90 kPa | 52 kPa | 106 kPa | 80 kPa |
| Static extension | 64.8 mm | 64.8 mm | 81.6 mm | 81.6 mm | 64.8 mm | 97.9 mm | 46.3 mm | 64.8 mm |

*Comparative example

The invention claimed is:

1. A food casing based on regenerated or precipitated cellulose, wherein said food casing comprises a reinforcement made of a wetfast nonwoven fibrous paper comprising fibers made of cellulosic material and fibers made of thermoplastic, wherein (i) the fibers made of cellulosic material and the fibers made of thermoplastic are firmly bonded to one another at the intersection points by (a) least partial melting of the fibers made of thermoplastic by calendaring the fibrous paper, (b) cellulose, and (c) optional synthetic resin; and (ii) said food casing comprises fibrous paper having a lower weight per unit area than a comparable food casing having the same strength that is formed without said fibers made of thermoplastic.

2. The food casing as claimed in claim 1, wherein the fraction of the nonwoven is 25 to 40% of the total weight of the casing in the dry state.

3. The food casing as claimed in claim 2, wherein the fraction of the nonwoven is 28 to 35% of the total weight of the casings in the dry state.

4. The food casing as claimed in claim 1, wherein said food casing is coated or impregnated on the inside and/or outside.

5. The food casing as claimed in claim 1, wherein the thermoplastic is amorphous or partially crystalline.

6. The food casing as claimed in claim 1, wherein the fibers made of cellulosic material are hemp fibers.

7. The food casing as claimed in claim 1, wherein said nonwoven is a fibrous paper.

8. The food casing as claimed in claim 1, wherein said casing loses from 8 to 15% wet strength after 10 minutes of treatment with 6% NaOH.

9. A process for producing a food casing as claimed in claim 1, comprising:

a) providing an aqueous pulp which comprises fibers made of cellulosic material and fibers made of or comprising thermoplastic polymers;

b) optionally mixing the aqueous pulp with water-soluble binders;

c) laying the aqueous pulp on a screen to form a fibrous paper;

d) drying the fibrous paper to form a dry fibrous paper;

e) at least partial melting of the thermoplastic fibers by calendaring the dry fibrous paper to form a calendared fibrous paper; and f) treating the calendared fibrous paper with dilute viscose to form a treated fibrous paper, g) regenerating the viscose to give cellulose hydrate;

h) drying the treated fibrous paper then;

i) shaping the treated fibrous paper into a tube having overlapping longitudinal edges;

j) charging the tube from the outside, from the inside or from both sides with viscose or with NMMO-cellulose solution; and k) precipitating and regenerating cellulose from the viscose or precipitating cellulose from the NMMO-cellulose solution.

10. The process as claimed in claim 9, wherein the fiber pulp contains no more than 0.5% by weight of fibers.

11. The process as claimed in claim 9, wherein the fibrous paper is dried on heated rollers having a large diameter.

12. The process as claimed in claim 9, wherein the at least partial melting of the thermoplastic fibers with calendering uses heated calender rollers, under the action of microwaves and/or infrared radiation.

13. A shirrable food casing based on regenerated or precipitated cellulose, wherein said food casing comprises a reinforcement made of a hydrolytically stable nonwoven fibrous paper comprising fibers made of cellulosic material and fibers made of thermoplastic, wherein (i) the fibers made of cellulosic material and the fibers made of thermoplastic are firmly bonded to one another at the intersection points by (a) at least partial melting of the fibers made of thermoplastic by calendaring the fibrous paper, (b) regenerated cellulose, and (c) optionally synthetic resin;

(ii) the fraction of the fibers made of thermoplastic is 2 to 20% by weight, based on the weight of the fibers made of cellulosic material; and (iii) said food casing comprises fibrous paper having a lower weight per unit area and 20 to 50% less regenerated cellulose than a comparable food casing having the same strength that is formed without said fibers made of thermoplastic.

14. The food casing as claimed in claim 13, wherein the fraction of the fibers made of thermoplastic is 5 to 15% by weight, based on the weight of the fibers made of cellulosic material.

15. The food casing as claimed in claim 13, wherein the fraction of the fibers made of thermoplastic is 7.5 to 12% by weight, based on the weight of the fibers made of cellulosic material.

16. The food casing as claimed in claim 13, wherein the fibers made of thermoplastic have a thickness of 0.5 to 8.0 den.

17. The food casing as claimed in claim 13, wherein the fibers made of thermoplastic have a thickness of 1.0 to 5.0 den.

18. The food casing as claimed in claim 13, wherein the fibers made of thermoplastic have a mean length of 0.3 to 15 mm.

19. The food casing as claimed in claim 13, wherein the fibers made of thermoplastic have a mean length of 4 to 8 mm.

20. The food casing as claimed in claim 13, wherein said nonwoven is bonded by dilute viscose.

21. The food casing as claimed in claim 20, wherein the fraction of regenerated cellulose from the dilute viscose is 1.0 to 3.0% by weight, based on the weight of the non-woven.

22. The food casing as claimed in claim 13, wherein said thermoplastic consists of polyolefin or block copolymers having polyolefin blocks, polyethylene terephthalate, polybutylene terephthalate, or polyamide.

23. The food casing as claimed in claim 13, wherein said nonwoven is additionally bonded by a synthetic resin.

* * * * *